June 4, 1968             J. ARBERMAN ETAL             3,387,221

PULSE DISCRIMINATOR WITH NOISE SUPPRESSION

Filed Feb. 9, 1966

INVENTORS
JEROME ARBERMAN
BERNARD W. ABRAMS

BY

ATTORNEYS

United States Patent Office 3,387,221
Patented June 4, 1968

3,387,221
PULSE DISCRIMINATOR WITH NOISE SUPPRESSION
Jerome Arberman, Cleveland Heights, and Bernard W. Abrams, South Euclid, Ohio, assignors, by mesne assignments, to the United States of America as represented by the Secretary of the Navy
Filed Feb. 9, 1966, Ser. No. 526,666
7 Claims. (Cl. 329—104)

The present invention relates generally to signal energy discriminators and in particular is a system for deriving intelligence data signals from a composite signal containing both intelligence data and spurious noise signals. In even greater particularity, it is a validation circuit for a Shipboard Ultrasonic Navigation System (colloquially called TRANSAC by the U.S. Navy and Clevite corporation).

In various and sundry navigation apparatus, echo-ranging devices such as sonars and radars are incorporated to determine range and bearing to known locations or targets. Such devices ordinarily make use of a received signal which contains the desired intelligence information along with unwanted and distracting noise signals. And, at times, due to uncontrollable environmental conditions, the unwanted noise signals are of such magnitude as to effectively cover up, or at least considerably suppress, the desired data signal combined therewith. Hence, for most practical purposes, the data signal is lost to a considerable extent, and the utilization apparatus processing it may become less effective and perhaps inoperative.

Likewise, in many condition-responsive instruments, received signals are processed to ascertain certain parameters or signal information, and often a similar adverse situation prevails so that the intelligence signal is hopelessly lost or submerged in ambient noise signals.

When, for example, such a system is a sonar system, the operational environment is water and usually sea water; thus, the unwanted signals may include white gaussion noise signals, resulting from molecular movement within the water, entrapped air bubbles, reflections and reverberations, and perhaps even movements and sounds of creatures of the sea.

In the past, in order to prevent losing the intelligence signal entirely, noise discriminators have been employed, and for many practical purposes such devices of the prior art have proven to be satisfactory. However, they were usually complex and left a great deal to be desired, as far as overall effectiveness of operation is concerned.

The present invention overcomes many of the disadvantages of the prior art because it is relatively simple in circuitry and may be made in compact form. Moreover, it performs in an eminently satisfactory manner when incorporated in the aforementioned TRANSAC system and improves operational results obtained therefrom considerably.

It is, therefore, an object of this invention to provide an improved method and means for enhancing the signal-to-noise ratio in a data processing system.

Another object of this invention is to provide a new and improved noise discriminator.

Still another object of this invention is to provide an improved method and means for detecting signal pulses in a background of noise.

A further object of this invention is to provide an improved, simplified method and means for effectively removing spurious signals from a composite signal containing both spurious and intelligence signals.

Another object of this invention is to provide a method and means for improving the validation of signals received by an echo-ranging system.

Still another object of this invention is to provide an improved validation circuit for a shipboard ultrasonic navigation system such as TRANSAC.

Another object of this invention is to provide an improved signal validation circuit that has general electronic and data processing utility and is easily and economically manufactured, used, and maintained.

Other objects and many of the attendant advantages will be readily appreciated as the subject invention becomes better understood by reference to the following detailed description when considered in conjunction with the accompanying drawings wherein.

Figure 1:
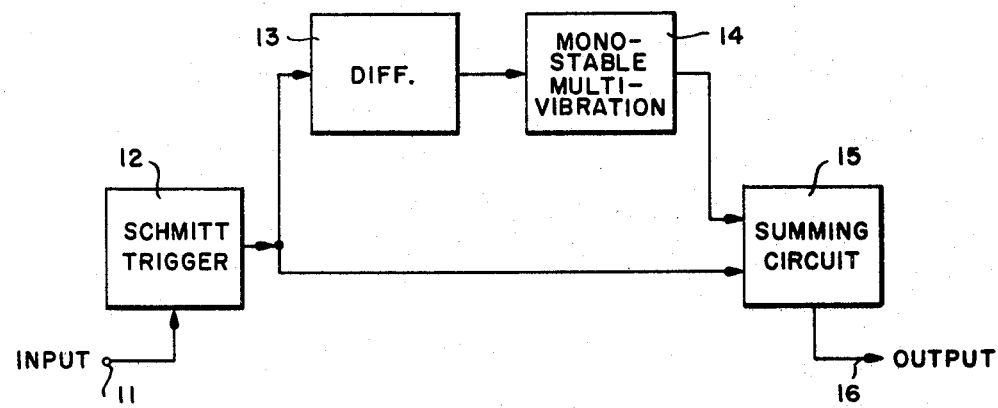
FIG. 1 is a functional block diagram of the subject invention.

Referring now to FIG. 1, the subject signal validation system is shown as having an input terminal 11 adapted for receiving an input signal containing both intelligence and spurious noise signals, from which it is desired to substantially eliminate said noise signals.

Connected to said input terminal 11 is a pulse height discriminator Schmitt trigger circuit 12, with the output thereof coupled to the input of a differentiator 13. The output of differentiator 13 is connected to the input of a monostable multivibrator 14 having a predetermined inherent unstable time period designed therein, the output of which is coupled to one of the inputs of a summing circuit 15.

The output of the aforesaid Schmitt trigger circuit 12 is also connected to the other input of summing circuit 15, and, as may readily be seen, the output thereof is coupled to an output terminal 16 which, of course, constitutes the output of the invention.

Inasmuch as the various elements of the device of FIG. 1 are represented in block diagram form, it should be understood that each thereof is well known and conventional per se; hence, it is their unique interconnection and interaction that constitutes the instant inventive concept and effects the results desired.

Figure 2:
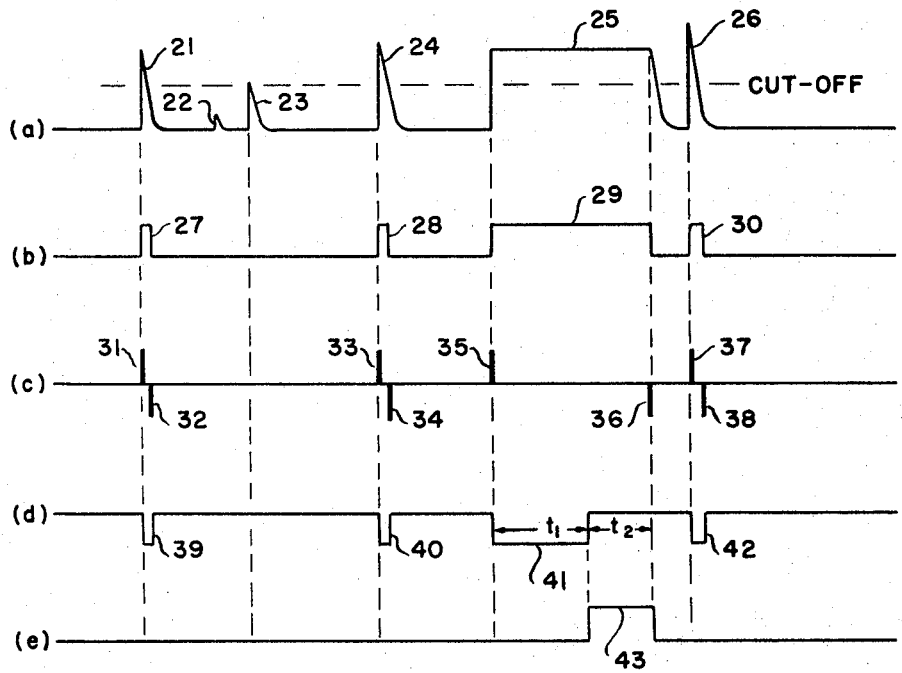
FIG. 2 is an idealized graphical representation of signal waveforms which occur as outputs from the various elements of FIG. 1, respectively.

Briefly, the operation of this invention is now discussed in conjunction with FIGS. 1 and 2.

A composite signal, similar to that shown in FIG. 2(a), containing a predetermined data signal and random noise signals constitute the input to Schmitt trigger 12. In this particular case, Schmitt trigger 12 is designed to be biased below cut-off so that, functionally speaking, it constitutes an amplitude detector and, thus, prevents low amplitude input pulses from producing an output. Of course, input pulses with sufficient amplitude to rise above the cut-off point will produce positive-going square wave outputs substantially similar to those depicted in FIG. 2(b). The duration (and hence the widths) of these positive-going square waves are dependent upon the time the cutoff point is exceeded. In the input signal illustration ideally represented by FIG. 2(a), it may be seen that pulses 21 through 26 are present therein. Moreover, it may be seen that pulses 21, 24, 25, and 26 have amplitudes that exceed the predetermined cut-off voltage, while pulses 22 and 23 do not. Therefore, after being processed by Schmitt trigger 12, pulses 22 and 23 of the exemplary input signal of FIG. 2(a) are not present in the output thereof depicted in FIG. 2(b), while pulses 21, 24, 25, and 26 are respectively present as square waves 27 through 30 therein.

The output waveforms of Schmitt trigger 12 is differentiated by differentiator 13 to produce the representative signal waveform shown in FIG. 2(c). Off-on pips 31 through 38 trigger monostable multivibrator 14 to respectively produce negative-going square waves 39 through 42. Square waves 39, 40, and 42 have a duration that is directly controlled by their respective on-off pips, but the duration $t_1$ of square wave 41 has been limited by the inherent unstable time interval or delay present in monostable multivibrator 14.

Although, for the most part, monostable multivibrators are quite well known to the artisans in the electronic field, because of its critical function in this particular invention, it would not appear to be too redundant and it might be better understood, if the design characteristics of monostable multivibrator 14, necessary for optimum operation thereof, are herewith explained in some detail.

Generally speaking, on being triggered by an input pulse, a monostable multivibrator switches to an unstable state, where it remains for a given time before returning to its original stable state. Particularly speaking, monostable multivibrator 14 is designed to act as a time detector by remaining in its unstable state for a predetermined time interval, the duration of which is set depending on the minimum widths of the intelligence data signals included in the composite signal. In other words, the widths of the data signals must be greater than the interval of time that multivibrator 14 is in its unstable state, in order for the data signals to be distinguished from the unwanted signals; hence, the desired unstable time interval to effect this result must be initially designed into multivibrator 14. Obviously, so doing is well within the purview of the artisan having the benefit of the teachings herein presented and, therefore, further structural disclosure is deemed unnecessary with respect to monostable multivibrator 14.

Actual recognition between valid and non-valid pulses, i.e., between signal and noise, takes place in summing circuit 15. The outputs of Schmitt trigger 12 and monostable multivibrator 14, exemplarily represented by the waveforms of FIG. 2(b) and FIG. 2(d), respectively, are applied as inputs to summing circuit 15 where they are appropriately mixed to present an output waveform similar to that illustrated in FIG. 2(e). As may readily be seen, square wave pulses 39, 40, and 42 have been canceled due to their being equal in duration and amplitude and opposite in polarity with respective square waves 27, 28, and 30. Square wave 41 was partially canceled by a portion of waveform 29 during such time $t_1$ as it fell within the inherently designed delay time interval of monostable multivibrator 14, with the remainder thereof, which occurred during time $t_2$, being supplied as output pulse 43. Hence, pulse 43 of the signal waveform of FIG. 2(e) actually constitutes the valid intelligence signal that is desired to be further processed in TRANSAC or other echo-ranging or data processing systems, and it remains because it was of such amplitude and duration that it was not canceled out by concommitant spurious noise signals.

With such an arrangement as this invention, most of the noise signals that adversely affect overall signal processing are eliminated or at least reduced sufficiently to considerably enhance the intelligence signals associated therewith. Accordingly, this invention tends to improve and facilitate the overall operation of signal processing systems such as TRANSAC, the system it is primarily intended to be incorporated in.

Other modifications and embodiments of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. Means for removing spurious noise signals from a composite electrical signal containing both said spurious noise signals and predetermined intelligence signals comprising in combination:

means for detecting and passing signals having amplitudes greater than a predetermined amplitude;

means effectively connected to the output of said signal detecting and passing means for reversing the polarities for a predetermined time interval of the aforesaid passed signals having amplitudes greater than a predetermined amplitude; and means connected to the outputs of said signal polarity reversing means and the aforesaid signal detecting and passing means for algebraically adding said passed and reversed polarity signals therefrom.

2. A noise rejection circuit comprising in combination:

means adapted for receiving a composite signal containing the noise to be rejected and an intelligence data signal;

means coupled to said receiving means for converting said composite signal into a second signal having uniform amplitude positive squarewave pulses in respective sequence and durations with those noise and data signals having an amplitude greater than a predetermined amplitude;

means connected to the output of said composite signal converting means for converting said second signal into a third signal having positive-going and negative-going pips which coincide in time and sequence with the positive-going leading and negative-going following edges of the positive squarewaves, respectively, of said second signal;

means connected to the output of said second signal converting means for converting the aforesaid positive-going and negative-going pips of said third signal into a fourth signal having squarewave pulses of equal amplitude and opposite polarity within a predetermined time interval and in coincidence with the leading and following edges respectively of the positive squarewave pulses of the aforesaid second signal; and means for mixing said second and fourth signals for canceling all equal and opposite polarity squarewave pulses contained therein except those whose duration exceeds the aforesaid time interval.

3. The device of claim 2 wherein said means coupled to said receiving means for converting said composite signal into a second signal having uniform amplitude squarewave pulses in respective proportional sequence and duration with those noise and data signals having an amplitude greater than a predetermined amplitude comprises a pulse height discriminator Schmitt trigger circuit.

4. The device of claim 2 wherein said means for converting said second signal into a third signal having positive-going and negative-going trigger pulses which coincide in time sequence with the positive-going and negative-going edges of the squarewaves of said second signal is a differentiator.

5. The device of claim 2 wherein said means for converting said positive-going and negative-going trigger pulses of said third signal into a fourth signal having squarewave pulses of equal amplitude and opposite polarity within a predetermined time interval and in coincidence with the leading and following edges respectively of the positive squarewave pulses of the aforesaid second signal is a monostable multivibrator.

6. The device of claim 2 wherein said means for mixing said second and fourth signals for canceling all equal and opposite pulses contained therein except those whose duration exceeds the aforesaid time interval is a summing circuit.

7. Means for removing spurious electrical signals from a composite electrical signal containing both said spurious electrical signals and predetermined electrical data signals comprising in combination:

a Schmitt trigger circuit;

a differentiator coupled to the output of said Schmitt trigger circuit;

a monostable multivibrator coupled to the output of said differentiator; and a summing circuit having a pair of inputs and an output, with one of the inputs thereof connected to the output of said monostable multivibrator and the other input thereof connected to the output of the aforesaid Schmitt trigger circuit.

References Cited

UNITED STATES PATENTS

| | | | |
|---|---|---|---|
| 2,776,410 | 1/1957 | Guanella | 325—65 X |
| 3,184,606 | 5/1965 | Ovenden et al. | 307—88.5 |
| 3,304,515 | 2/1967 | Stieler | 307—88.5 |

ALFRED L. BRODY, *Primary Examiner.*